United States Patent
Kuo et al.

(10) Patent No.: US 12,182,657 B2
(45) Date of Patent: Dec. 31, 2024

(54) BARCODE IMAGE RECOGNITION METHOD AND DEVICE USING THE SAME

(71) Applicant: Getac Technology Corporation, New Taipei (TW)

(72) Inventors: Chun-Yu Kuo, Taipei (TW); Da-Ke Liu, Taipei (TW)

(73) Assignee: Getac Technology Corporation, New Taipei (TW)

( * ) Notice: Subject to any disclaimer, the term of this patent is extended or adjusted under 35 U.S.C. 154(b) by 0 days.

(21) Appl. No.: 18/217,670

(22) Filed: Jul. 3, 2023

(65) Prior Publication Data
US 2024/0296299 A1  Sep. 5, 2024

Related U.S. Application Data

(60) Provisional application No. 63/449,272, filed on Mar. 1, 2023.

(51) Int. Cl.
*G06K 7/10* (2006.01)
*G06K 7/14* (2006.01)
(Continued)

(52) U.S. Cl.
CPC ....... *G06K 7/10722* (2013.01); *G06K 7/1413* (2013.01); *H01M 12/02* (2013.01);
(Continued)

(58) Field of Classification Search
CPC .... G06K 7/10722; G06K 7/1413; G06K 7/14; G06K 7/1478
(Continued)

(56) References Cited

U.S. PATENT DOCUMENTS

| | | | | |
|---|---|---|---|---|
| 2013/0328689 A1* | 12/2013 | Hayashi | ............... | G07D 11/235 340/691.6 |
| 2014/0231523 A1* | 8/2014 | Polianko | ............... | G06K 7/1417 235/462.09 |
| 2015/0146925 A1* | 5/2015 | Son | ........................ | G06V 20/00 382/103 |

FOREIGN PATENT DOCUMENTS

| | | |
|---|---|---|
| CN | 104268498 B | 9/2017 |
| EP | 2423848 A2 | 2/2012 |

(Continued)

OTHER PUBLICATIONS

Honeywell Barcode Scanner—Apps on Google Play.
(Continued)

*Primary Examiner* — Edwyn Labaze
(74) *Attorney, Agent, or Firm* — Locke Lord LLP; Tim Tingkang Xia, Esq.

(57) ABSTRACT

A barcode image recognition method includes the following steps: capturing at least one barcode to generate a preview image, the preview image having at least one barcode image of the at least one barcode; decoding the barcode image to obtain barcode information and a plurality of vertex coordinates of the barcode image; caching the barcode information of the barcode image; forming a plurality of image boundaries of the barcode image with the plurality of vertex coordinates of the barcode image; generating a detection beeline from a specified point to a side edge of the preview image; determining the number of intersections of the plurality of image boundaries of the barcode image and the detection beeline; identifying the barcode image with odd number of intersections from the at least one barcode image as a target image; and outputting the barcode information of the target image.

11 Claims, 12 Drawing Sheets

(51) Int. Cl.
     *H01M 12/02*        (2006.01)
     *H01M 50/528*     (2021.01)
     *H02J 7/00*          (2006.01)

(52) U.S. Cl.
     CPC ....... *H01M 50/528* (2021.01); *H02J 7/00041* (2020.01); *H02J 7/0013* (2013.01); *H02J 7/0016* (2013.01); *H02J 7/0018* (2013.01); *H02J 7/0025* (2020.01); *H02J 7/0029* (2013.01); *H02J 7/0047* (2013.01); *H02J 7/0048* (2020.01); *H02J 7/0068* (2013.01); *H02J 7/00712* (2020.01); *H02J 2207/10* (2020.01)

(58) Field of Classification Search
     USPC .......... 235/462.41, 462.24, 462.11, 454, 375
     See application file for complete search history.

(56) References Cited

FOREIGN PATENT DOCUMENTS

| | | |
|---|---|---|
| EP | 3767519 A1 | 1/2021 |
| JP | 2011209805 A | 10/2011 |

OTHER PUBLICATIONS https://play.google.com/store/apps/details?id=com.scandit.KeyboardWedge&hl=en&gl=US.
How can I precisely select one barcode among many?—Frequently Asked Questions (FAQ) (scandit.com).

* cited by examiner

BARCODE IMAGE RECOGNITION METHOD AND DEVICE USING THE SAME

CROSS-REFERENCE TO RELATED APPLICATION

This application claims the benefit of U.S. provisional application Ser. No. 63/449,272, filed on Mar. 1, 2023. The entirety of the above-mentioned patent application is hereby incorporated by reference herein and made a part of the specification.

BACKGROUND OF THE INVENTION

The present disclosure relates to a barcode recognition technology, and particularly relates to a barcode image recognition method and a device using the same.

Barcodes are widely used in current commerce and industry and are often used for commodity marking, logistics tracking, stock management, production process control and the like, and a plurality of barcodes of the same type or different types may be set on one article. When a user scans an interface with a plurality of barcodes, a barcode decoder may receive a plurality of barcode images captured by a scanner, resulting in decoding failure or errors.

SUMMARY OF THE INVENTION

In view of this, the present disclosure provides a barcode image recognition method and a device using the same, which are suitable for scanning and obtaining barcode information of an expected barcode among a plurality of barcodes, and therefore the barcode information of the expected barcode can be accurately and controllably obtained.

In one embodiment, a barcode image recognition method includes: capturing at least one barcode to generate a preview image, the preview image having at least one barcode image of the at least one barcode; decoding the barcode image to obtain barcode information and a plurality of vertex coordinates of the barcode image; caching the barcode information of the barcode image; forming a plurality of image boundaries of the barcode image with the plurality of vertex coordinates of the barcode image; generating a detection beeline from a specified point to a side edge of the preview image; determining the number of intersections of the plurality of image boundaries of the barcode image and the detection beeline; identifying the barcode image with odd number of intersections from the at least one barcode image as a target image; and outputting the barcode information of the target image.

The present disclosure further provides a barcode image recognition device. In one embodiment, the barcode image recognition device includes an optical sensing module, a decoding module, a displayer and a processing module. The optical sensing module is configured to scan at least one barcode to generate a preview image, the preview image having at least one barcode image of the at least one barcode. The decoding module is coupled to the optical sensing module and configured to decode the barcode image to obtain barcode information and a plurality of vertex coordinates of the barcode image. The processing module is coupled to the decoding module and the displayer and configured to determine a target image according to a specified point and a plurality of image boundaries of the barcode image and display the barcode information of the target image on the displayer.

BRIEF DESCRIPTION OF DRAWINGS

FIG. 3a is a schematic diagram of a preview image in step S10 of FIG. 2a.

FIG. 3b is a schematic diagram of a first example of a detection beeline in step S50 of FIG. 2a.

FIG. 3c is a schematic diagram of a second example of a detection beeline in step S50 of FIG. 2a.

FIG. 4 is a schematic application diagram of an example in step S80 of FIG. 2a.

DETAILED DESCRIPTION OF THE INVENTION

Figure 1:
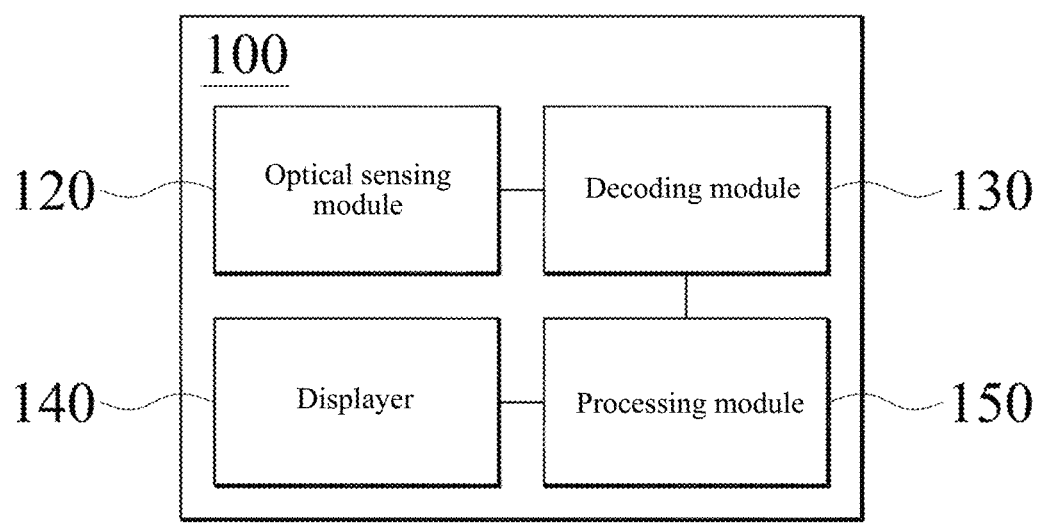
FIG. 1 is a functional block diagram of a barcode image recognition device according to some embodiments.

Referring to FIG. 1, a barcode image recognition device 100 is suitable for scanning a plurality of barcodes to obtain and output barcode information of an expected barcode. The barcode image recognition device 100 includes an optical sensing module 120, a decoding module 130, a displayer 140 and a processing module 150. The optical sensing module 120 is coupled to the decoding module 130; and the decoding module 130 and the displayer 140 are coupled to the processing module 150.

In some embodiments, commodities or shelves are provided with one or more barcodes. Each barcode may carry relevant information, such as producing areas, prices, batch numbers and activity websites. In some embodiments, these barcodes may be adjacently set (such as pasted or printed) on the commodities or the shelves.

Figure 2A:
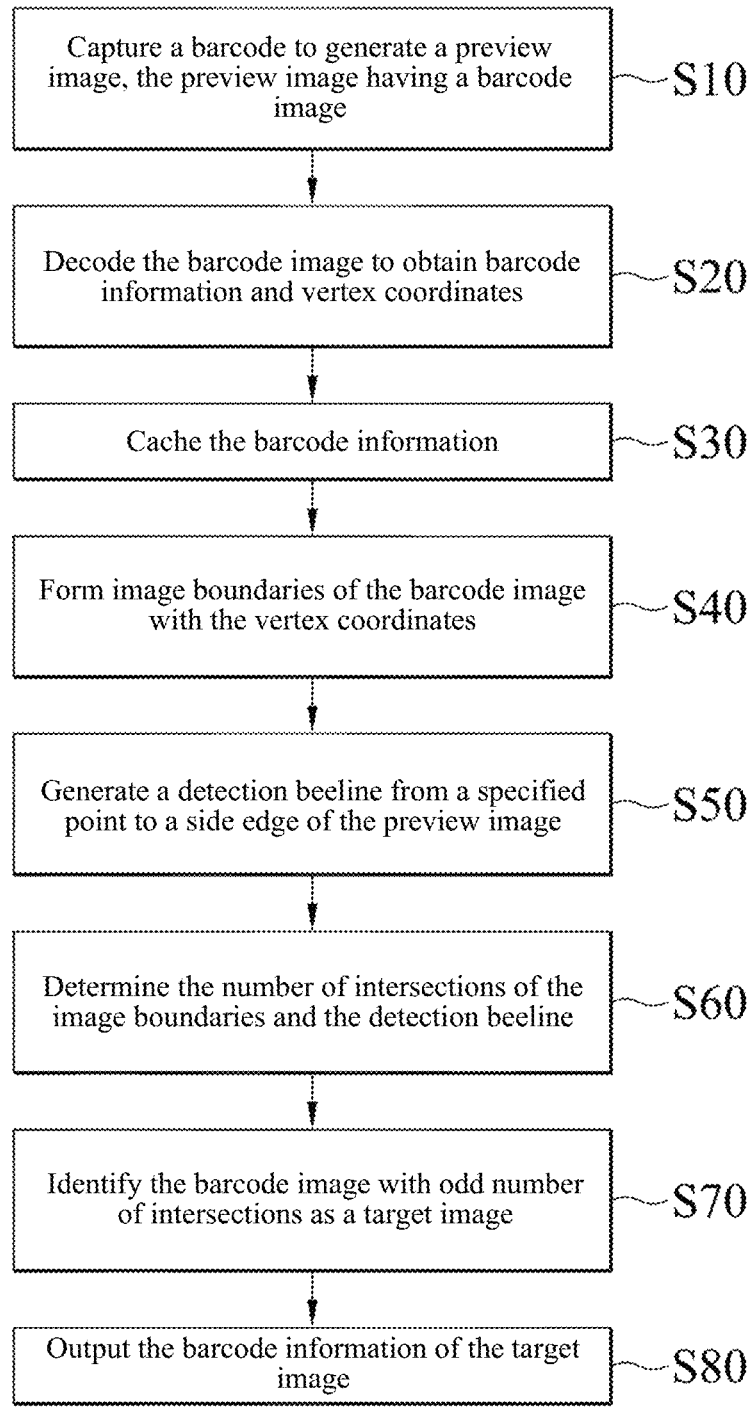
FIG. 2a is a flowchart of a barcode image recognition method according to some embodiments.

As shown in FIG. 1 and FIG. 2a, in a case of acquiring the barcode information represented by the expected barcode among a plurality of barcodes, the barcode image recognition device 100 will scan the barcodes with the optical sensing module 120 to capture a preview image with barcode images of the barcodes (step S10).

Figure 3A:
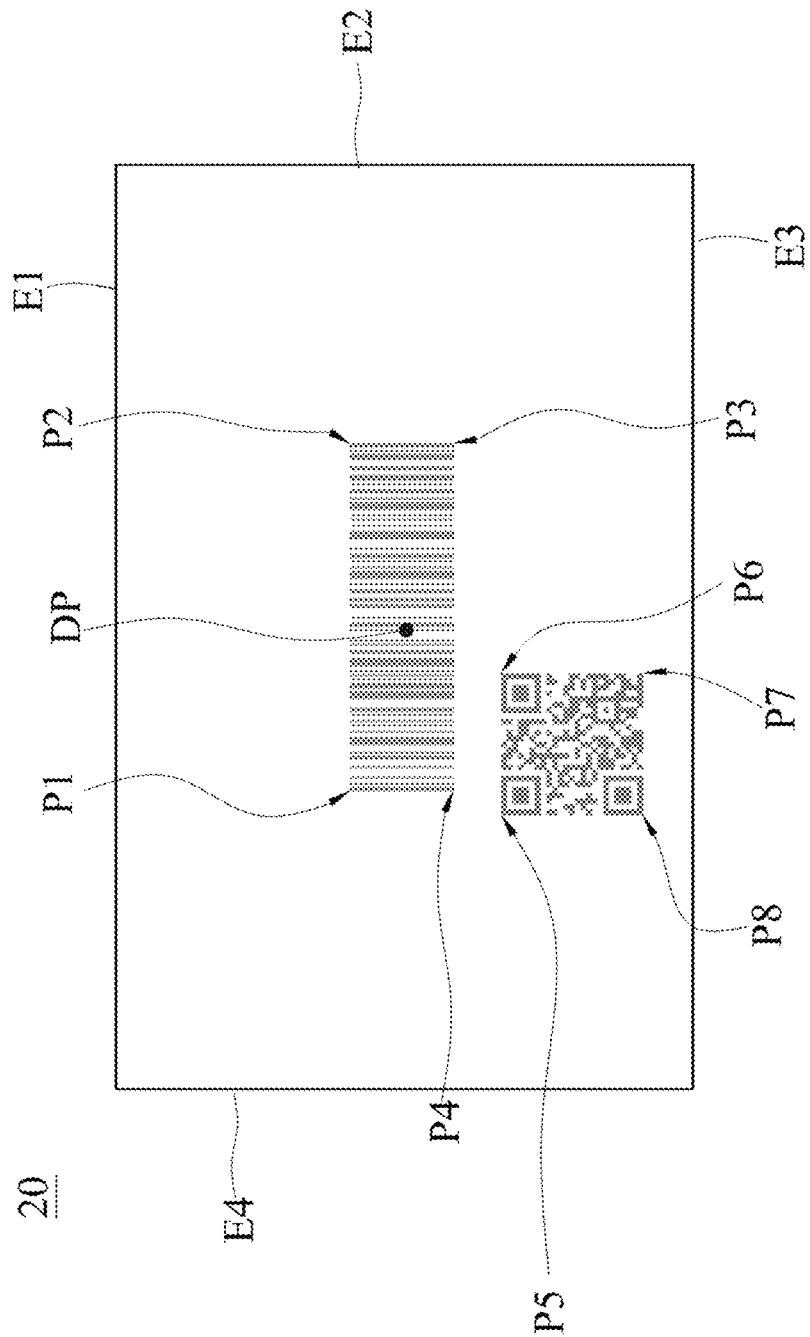
Figure 3B:
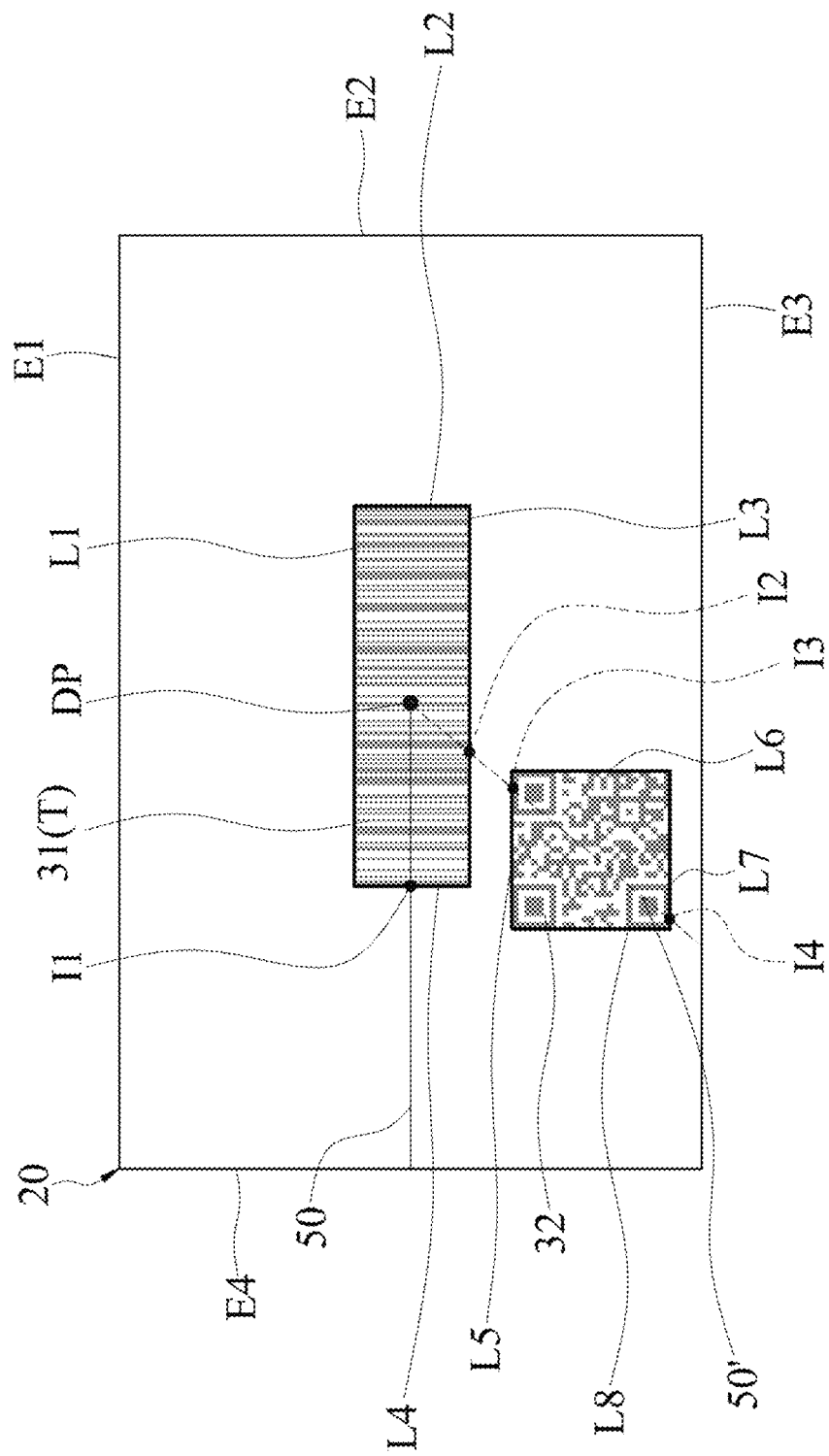

Referring to FIG. 3a and FIG. 3b, the optical sensing module 120 forms a preview image 20 after capturing the barcodes. In some embodiments, the preview image 20 is enclosed by a plurality of side edges, for example, four side edges E1, E2, E3 and E4 enclose a rectangular window. The preview image 20 has the barcode images. The barcode images correspond to the scanned barcodes, so that the preview image 20 has the same number of barcode images as the barcodes. Among the plurality of barcode images, one of the barcode images will be taken as a target image T. The target image T is a barcode that a user wants to read and decode to obtain the information when operating the barcode image recognition device 100. The preview image 20 can be transmitted to the displayer 140 for displaying through the processing module 150, and thus the user can know the range captured by the optical sensing module 120 during use in real time.

Continuing referring to FIG. 2a, the decoding module 130 decodes the barcode images to obtain the barcode information represented by one or more barcodes (step S20). The decoding module 130 is generally composed of one or more decoding algorithms, and can recognize different types of barcodes. The decoded barcode information can be cached in an internal memory of the processing module 150, or stored in various external memories connected to the processing module 150 (step S30). The barcode information is a content represented by the barcode, can be a text or a website, and can also be an audio, a graphic file and the like in some embodiments. For example, when the barcode information is the text, corresponding information can be obtained by scanning and reading the barcode, and thus rapid recognition and communication are realized. When the barcode information is the website, a function of rapidly opening a corresponding website page on an electronic device is realized.

The decoding module 130 obtains a plurality of vertex coordinates of one or more barcode images while decoding the barcode images (step S20). The situation that the barcode image is a rectangle is taken as an example, and the barcode image has four vertexes. The vertex coordinates refer to coordinate values of each vertex of the barcode image on a coordinate system of the preview image 20. Specifically, image pixels of the preview image 20 can be distributed as a two-dimensional coordinate system, the coordinate system has an X-axis and a Y-axis, and the vertex coordinates of the barcode image are absolute coordinates of the vertex on the coordinate system.

For example, the barcode image recognition device 100 generates the preview image 20 after capturing the images of two barcodes located on the same plane (see FIG. 3a). The preview image 20 has a barcode image 31 of a first barcode and a barcode image 32 of a second barcode. The barcode images 31 and 32 respectively have four vertexes. The decoding module 130 decodes the barcode images 31 and 32 to obtain four vertex coordinates P1, P2, P3 and P4 of the barcode image 31 and four vertex coordinates P5, P6, P7 and P8 of the barcode image 32.

Referring to FIG. 3b, four image boundaries of the barcode images 31 and 32 can be respectively formed with the vertex coordinates (step S40). The length-width ratio of a range enclosed by the image boundaries is the same as that of the barcode.

The preview image 20 has a specified point DP. The specified point DP can be located at any position in the preview image 20, and the position relates to a subsequent method for determining the target image T among the plurality of barcode images. In some embodiments, the specified point DP can be positioned right in the middle of the preview image, and the coordinate value of the specified point DP is (0, 0) with respect to the coordinate system.

Figure 4:
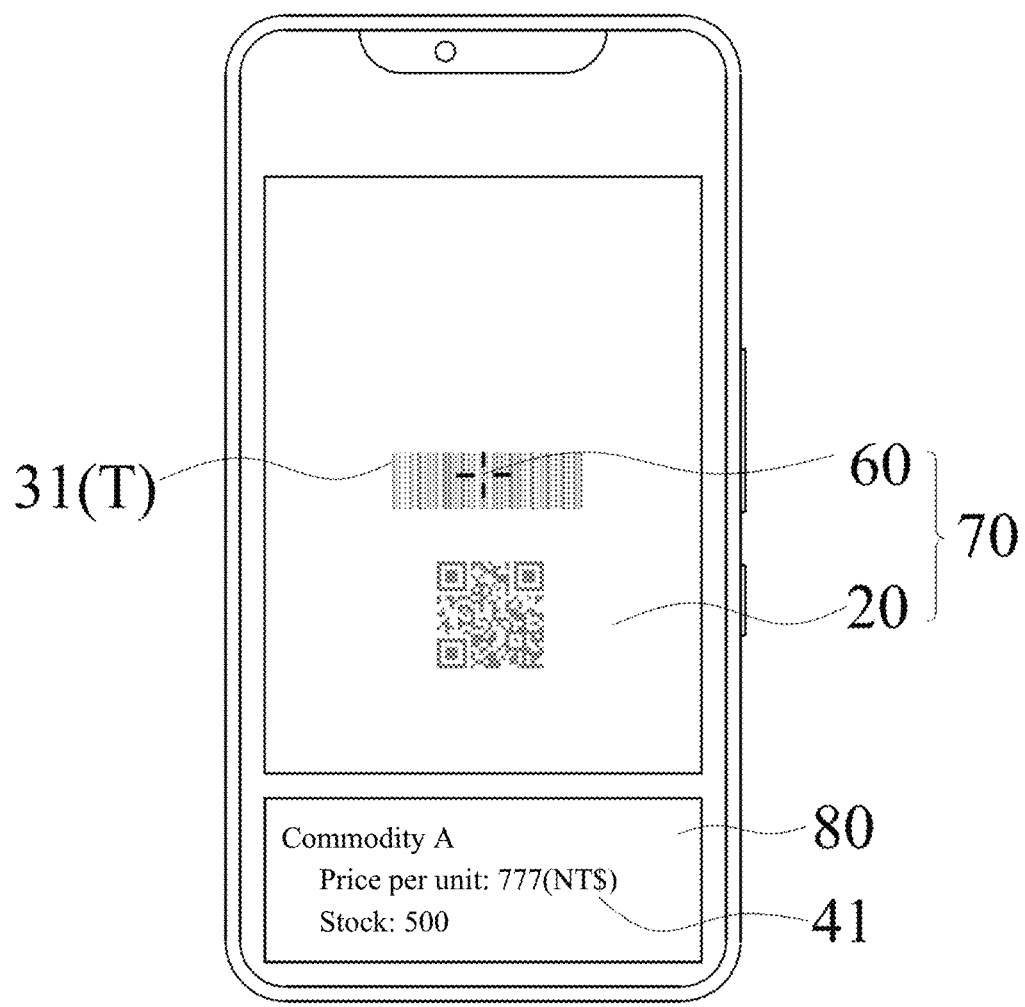

In some embodiments, the user can know the range captured by the optical sensing module 120 during use in real time, and as described above, the information of the captured range is displayed by transmitting the preview image 20 to the displayer 140 through the processing module 150. In order to facilitate the operation of the user, a prompt mark 60 is provided at a position corresponding to the specified point DP. The processing module 150 synthesizes the prompt mark 60 and the preview image 20 and transmits to the displayer 140 for displaying. A picture synthesized by the prompt mark 60 and the preview image 20 is called a synthesized image 70 (as shown in FIG. 4).

In some embodiments, the prompt mark 60 can be a cross line taking the specified point DP as an intersection or a geometric figure taking the specified point DP as a center. When using the barcode image recognition device 100, the user can align the prompt mark 60 to a barcode with information to be outputted. Then, through the operation of the processing module 150, even if the quantity of barcodes is large and the barcode image cannot be independently captured by the optical sensing module 120, the information of the expected barcode can also be obtained.

Continuing referring to FIG. 2a and FIG. 3b, the method for determining the target image T by the processing module 150 includes: generating a detection beeline 50 from the specified point DP to any point on a side edge of the preview image 20 in the preview image 20 (step S50). The direction in which the detection beeline 50 is generated is not limited, for example, in FIG. 3b, the detection beeline 50 is generated in the direction from the specified point DP to the side edge E4, and the detection beeline 50 can also form a detection beeline 50' in the direction from the specified point DP to the side edge E3.

Then, the target image T is determined by determining the number of intersections generated by the detection beeline 50 and the image boundary in the barcode image (step S60). The number of the intersections generated by the image boundary of the target image T and the detection beeline 50 will be odd number, so the processing module 150 can find out the barcode image with odd number of the intersections as the target image T (step S70).

Referring to FIG. 2a and FIG. 4, after the target image T is determined, the barcode information cached after decoding is extracted, and the information is outputted and displayed by the displayer 140 (step S80). A result field 80 can be set on the displayer 140, and the barcode information is displayed in the result field 80, so that the user can visually obtain the information represented by the barcode. The design of the result field 80 in the displayer 140 can be adjusted according to the requirements of the user. In some embodiments, the synthesized image 70 and the result field 80 can be simultaneously displayed on the displayer 140, for example, the synthesized image 70 and the result field 80 are displayed in a display frame in parallel, the user refers to the display frame in the synthesized image 70 to capture the image of the barcode, and the barcode information can be obtained in the result field 80 after the image is recognized by the decoding module 130 and the processing module 150. In some embodiments, the result field 80 can be presented as a window, and the window will pop up after the processing module 150 determines the target image T and display the barcode information.

Continuing referring to FIG. 3a, FIG. 3b and FIG. 4, as described above, the optical sensing module 120 captures the images of two barcodes, and the decoding module 130 decodes the images to obtain barcode information 41 of the first barcode, barcode information 42 of the second barcode (not shown in the figure) and respective four vertex coordinates P1, P2, P3, P4, P5, P6, P7 and P8 of the two barcodes. The barcode information 41 and 42 are cached in the processing module 150, so as to be extracted and displayed conveniently after determining the target image T. The adjacent vertex coordinates are connected through two points to form a plurality of image boundaries L1, L2, L3, L4, L5, L6, L7 and L8. The detection beeline 50 is generated from the specified point DP of the preview image 20 to any side edge E4 of the preview image 20. An intersection I1 is generated by the detection beeline 50 and one image boundary L4 of the barcode image 31, the number of the intersection is 1 and is an odd number, so the barcode image 31 is taken as the target image T and the barcode information 41 is outputted to the result field 80.

In another embodiment, the detection beeline 50', the image boundary L3 of the barcode image 31, and the image boundaries L5 and L7 of the barcode image 32 generate intersections I2, I3 and I4, and the total number of the intersections is 3. Although the detection beeline 50 and both the two barcode images 31 and 32 generate the intersections, the number of the intersection I1 of the barcode image 31 is 1, which is an odd number, the number of the intersections I2 and I3 of the barcode image 32 is 2, which is an even number, therefore, the barcode image 31 is taken as the target image T and the barcode information 41 is outputted.

Figure 2B:
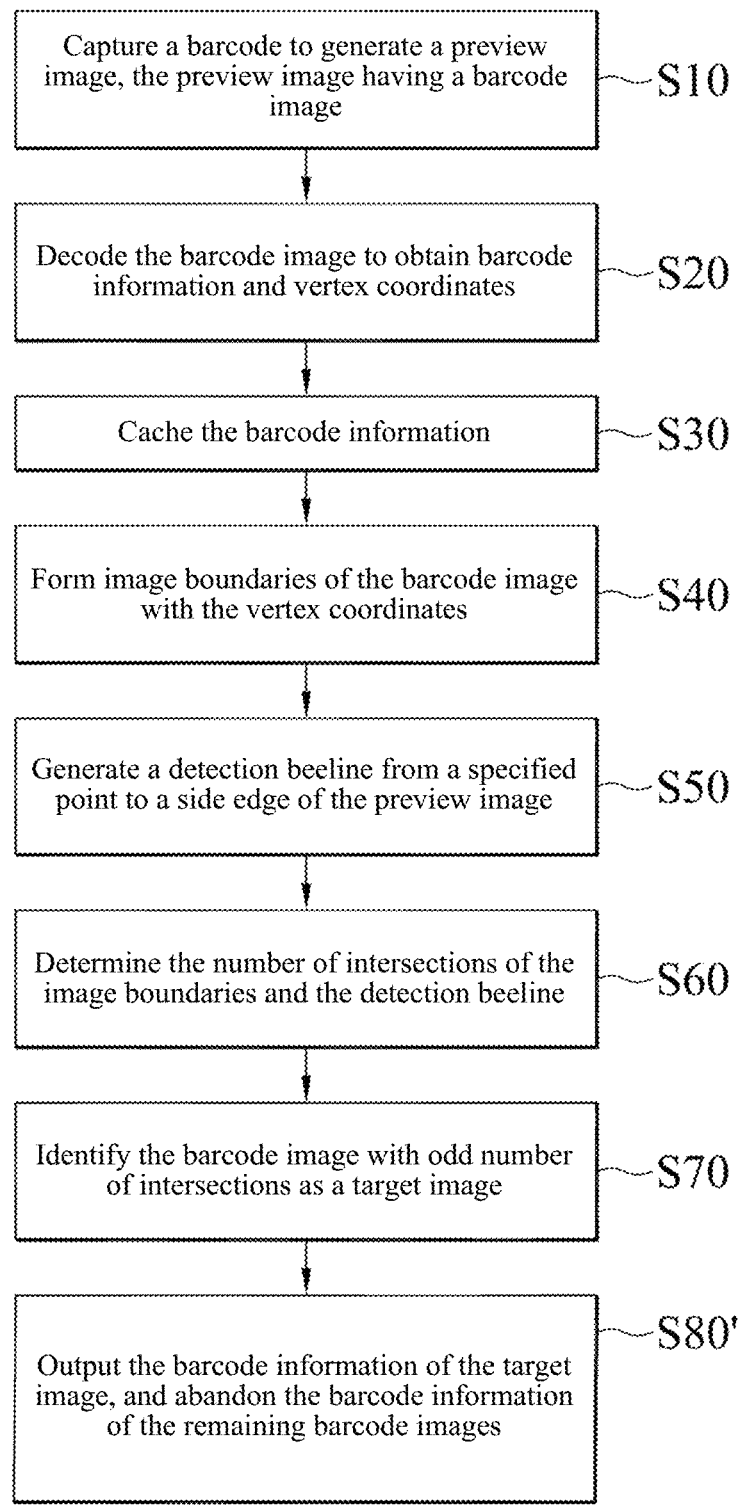
FIG. 2b is a flowchart of a barcode image recognition method according to other embodiments.

Referring to FIG. 2b, in some embodiments, after the processing module 150 determines the target image T according to the number of the intersections of the image boundaries and the detection beeline 50 (step S40 to step S70), and when the displayer 140 outputs the barcode information of the target image T, the processing module 150 or an external memory that stores the barcode information simultaneously abandon the remaining barcode information with even number of intersections (step S80').

Figure 3C:
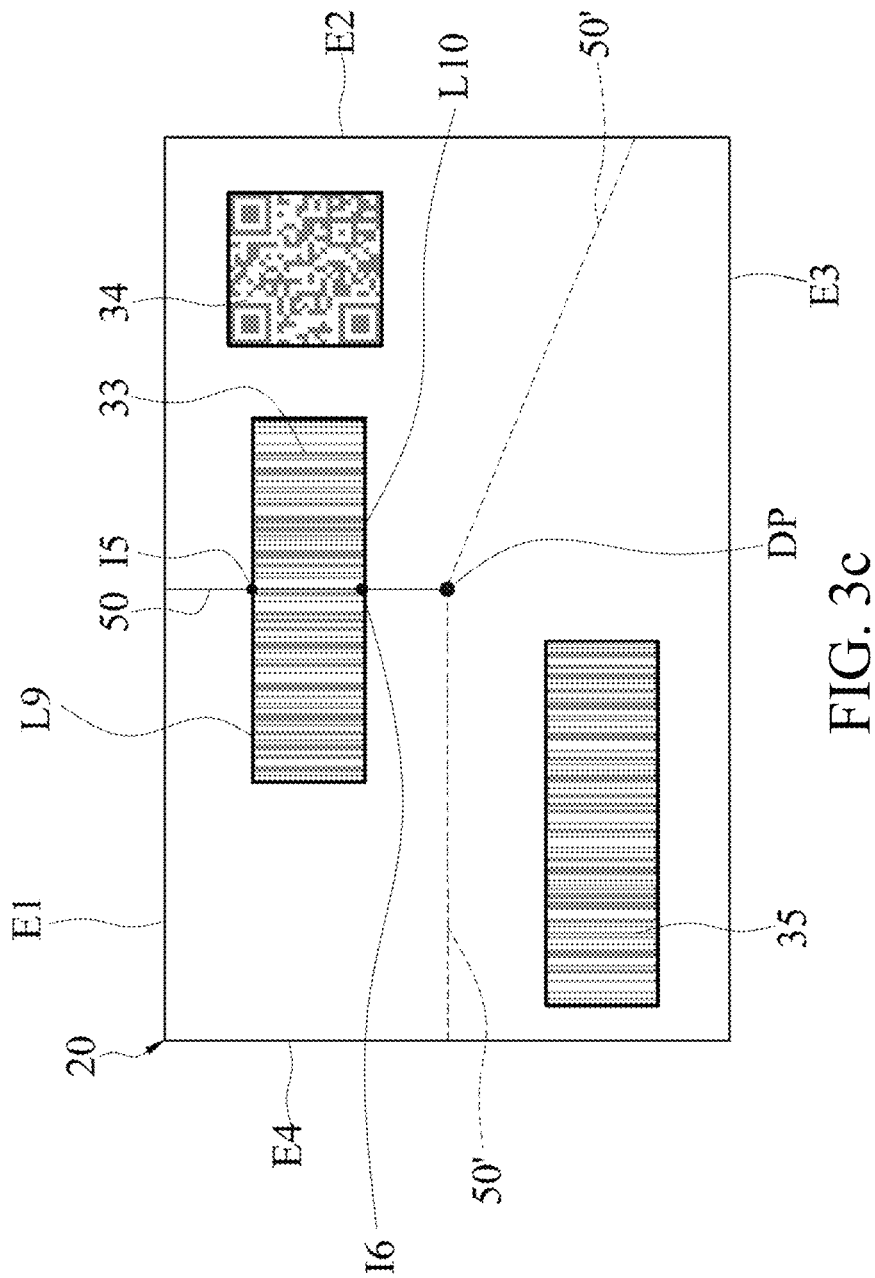

With regard to the total number of intersections, if the total number is an odd number, it indicates that the preview image 20 has the target image T, and further determination can be made to obtain the barcode image with odd number of intersections; and if the total number is an even number, it indicates that the preview image 20 does not have the target image T. Referring to FIG. 3c, in some embodiments, the preview image 20 has three barcode images 33, 34 and 35, and the three barcode images 33, 34 and 35 have a plurality of image boundaries respectively. Two intersections are generated by the detection beeline 50 and the image boundaries in total, namely, the intersections 15 and 16 generated by the detection beeline and the image boundaries L9 and L10, and the number is an even number, thus the preview image 20 does not have the target image T, related barcode information cannot be outputted, and the decoded barcode information 41 and 42 will be abandoned.

In some other embodiments, after the detection beeline 50 is formed from the specified point DP to one side edge of the preview image 20, no intersection is generated between the detection beeline 50 and any image boundary in the preview image 20, thus it can be determined that the number of intersection is zero and is an odd number, and no target image T exists. For example, the detection beeline 50' is formed from the specified point DP to the side edges E2 and E4 of the preview image 20 respectively, and no intersection is generated between the detection beeline 50' and any image boundary in the preview image 20.

In some embodiments, the optical sensing module 120 and the decoding module 130 can be integrated into an independent component such as a barcode engine 110, so as to be embedded into a common electronic device. The common electronic device can be a handheld device such as a smart phone, a notebook computer and a tablet personal computer or a handheld or desktop checkout machine.

The optical sensing module 120 of the barcode engine 110 captures the image of the barcode; then the decoding module 130 decodes the preview image 20 formed by the optical sensing module 120; and after decoding, barcode data is transmitted to other elements of the barcode image recognition device 100 for processing through a connection interface.

Figure 5:
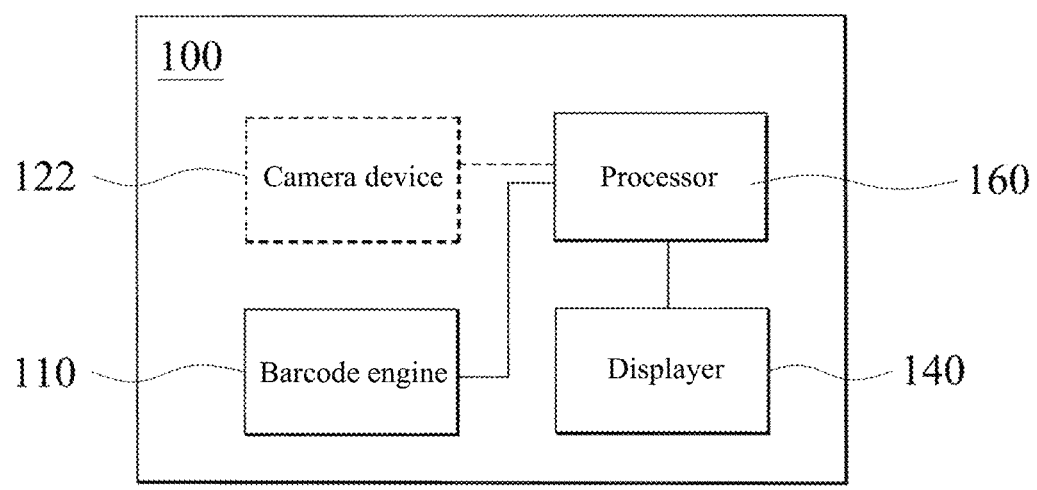
FIG. 5 is a functional block diagram of an example of a barcode image recognition device of FIG. 1.
Figure 6:
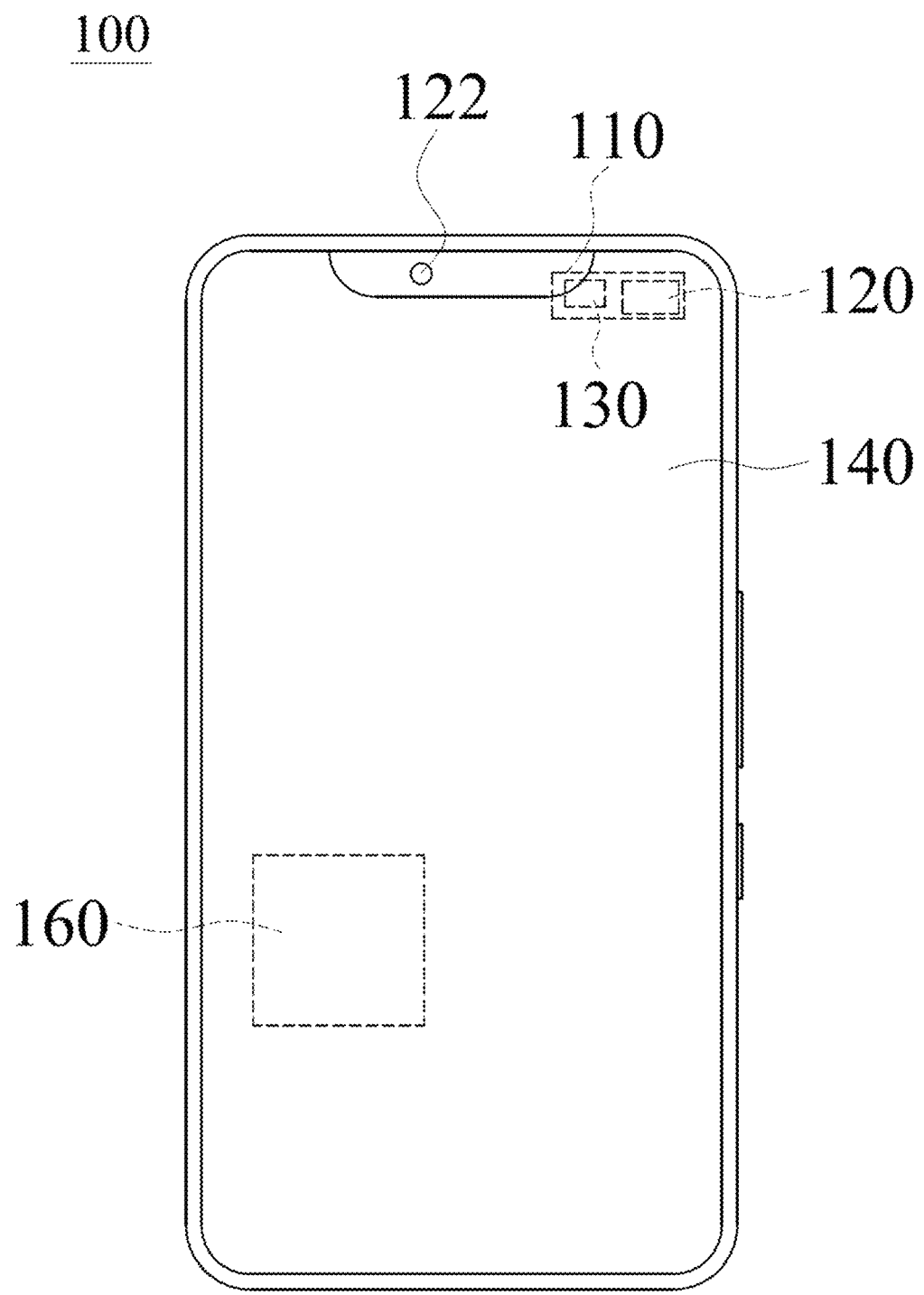
FIG. 6 is a schematic diagram of an example of a barcode image recognition device of FIG. 5.

Referring to FIG. 5 and FIG. 6, the barcode image recognition device 100 includes the barcode engine 110, the displayer 140 and the processing module 150. The barcode engine 110 includes the optical sensing module 120 and the decoding module 130. The barcode engine 110 is coupled to the displayer 140 and the processing module 150. The barcode engine 110 captures and decodes the barcode image, and transmits the preview image 20 to the processing module 150 for caching of the barcode information, recognition of the target image T and output and/or abandoning of the barcode information.

In some embodiments, the barcode engine 110 is embedded in the electronic device. Therefore, a processor 160 of the electronic device can be directly used as the processing module 150 of the barcode image recognition device 100. A screen of the electronic device is used as the displayer 140 of the barcode image recognition device 100, the synthesized image 70 and the result field 80 are displayed through a user interface of the electronic device, and a caching position of the barcode information can be an internal memory of the processor 160 or an external memory of the electronic device. In some embodiments, a camera device 122 of the electronic device can be alternately used with the optical sensing module 120 in the barcode engine 110, the camera device 122 acquires the barcode image of the barcode, and the barcode image is transmitted to the processor 160 and the decoding module 130 for subsequent processing through the connection interface.

In some embodiments, the barcode engine 110 may include an application programming interface (API), which allows a designer to customize parameters of the optical sensing module 120 and a processing mode of a result decoded by the decoding module 130 according to the requirements of the user. The user can access the barcode engine 110 with the API to obtain the barcode image, and transmit the barcode image to the decoding module 130 for decoding. Then, the preview image 20 formed by the barcode image and the barcode information decoded by the decoding module 130 are transmitted to the processor 160 of the electronic device. Therefore, the influence caused by a fixed decoding algorithm of the decoding module 130 can be avoided through the API.

Figure 7:
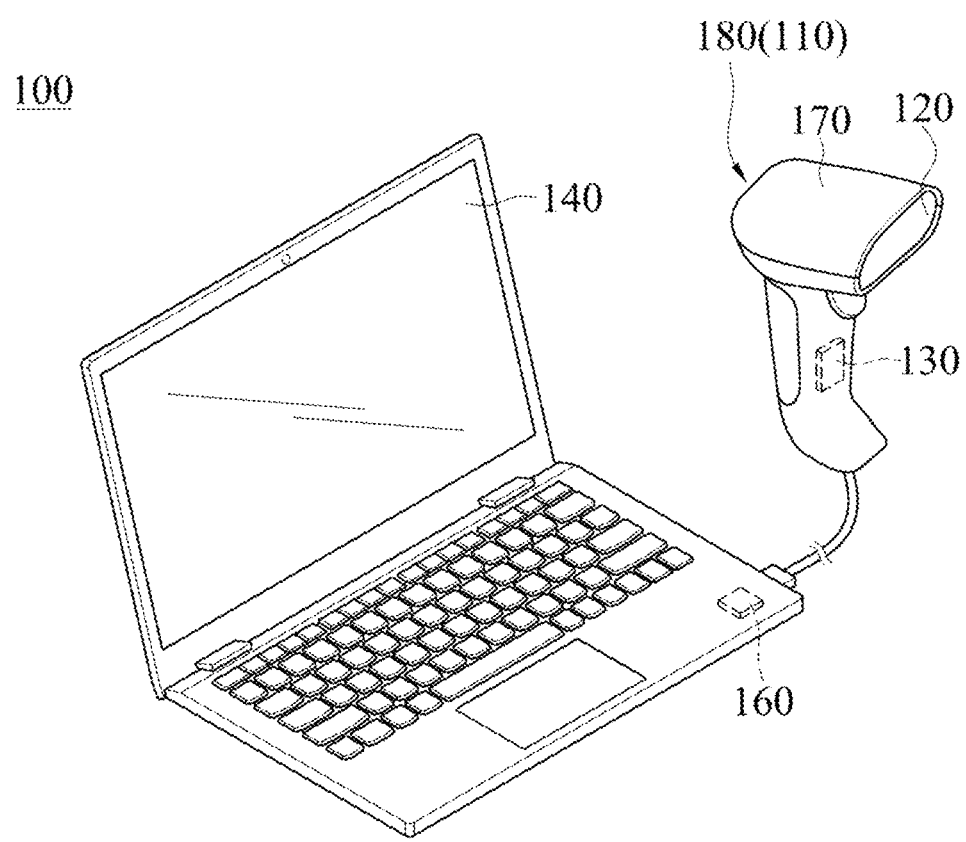
FIG. 7 is a schematic diagram of another example of a barcode image recognition device of FIG. 5.

Referring to FIG. 7, the barcode engine 110 can be implemented by a handheld scanner 180. The optical sensing module 120 and the decoding module 130 are located in a casing 170. The preview image 20 and the barcode information which are captured and decoded by the barcode engine 110 are transmitted to the electronic device from the barcode engine 110 in a wired or wireless mode, such as a USB or RS232 connection mode. The electronic device includes the processor and the displayer which are inherent in the electronic device. The same as the previous embodiment, the processor inherent in the electronic device is directly used as the processing module 150 of the barcode image recognition device 100, and the screen of the electronic device is used as the displayer 140 of the barcode image recognition device 100. The designer sets a method for detecting the target image T and a visual result field 80 window in the processor 160 of the electronic device. In some embodiments, the barcode image recognition device 100 can be operated in a fixed environment, such as a supermarket cashier desk; and the environmental parameters of the optical sensing module 120 are adjusted during design according to the requirements of the user, so as to improve the environmental adaptability of the optical sensing module 120.

Figure 8:
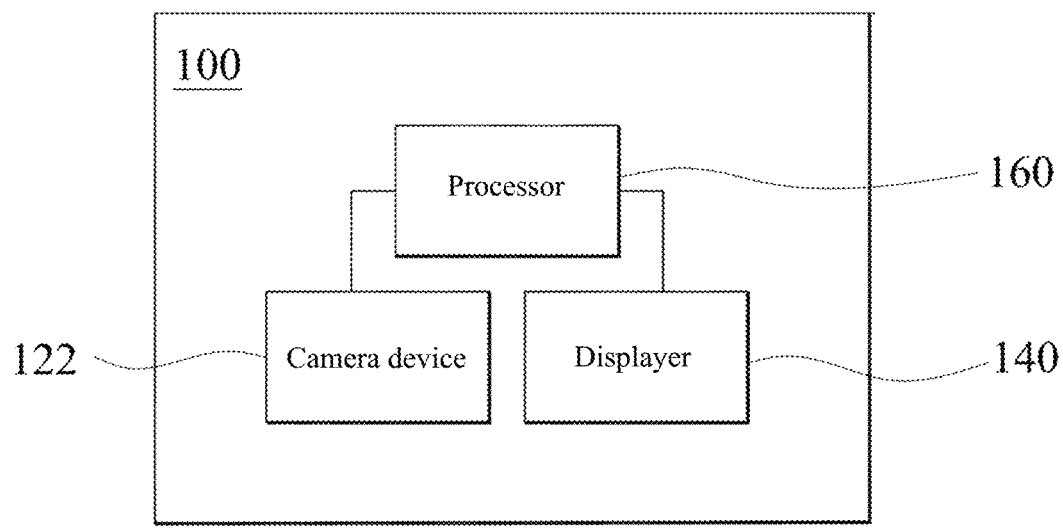
FIG. 8 is a functional block diagram of another example of a barcode image recognition device of FIG. 1.
Figure 9:
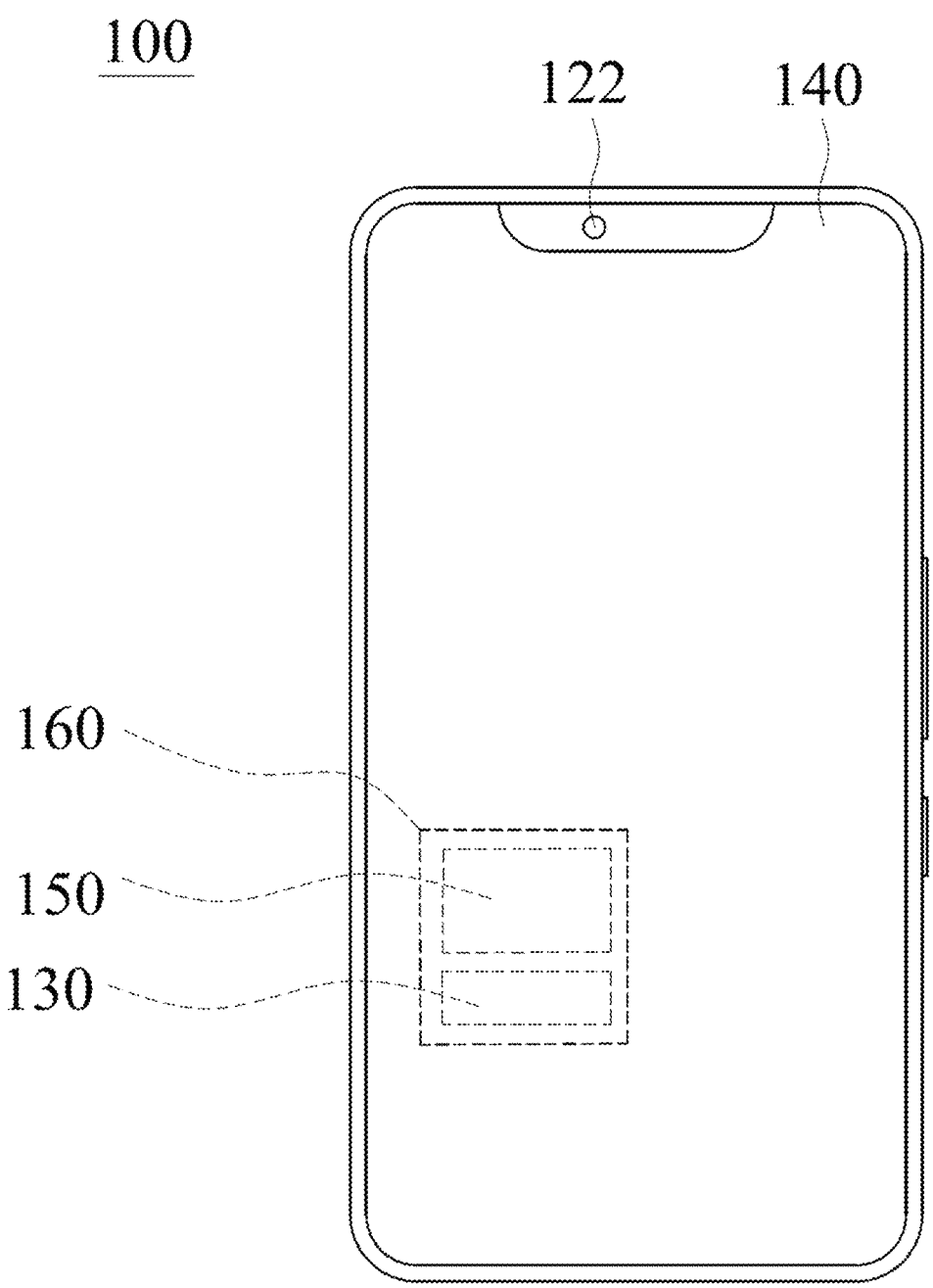
FIG. 9 is a schematic diagram of an example of a barcode image recognition device of FIG. 8.

Referring to FIG. 8 and FIG. 9, in some embodiments, the optical sensing module 120 is the camera device 122. The barcode image recognition device 100 includes the camera device 122, the displayer 140 and the processor 160. The camera device 122 is coupled to the displayer 140 and the processor 160. The camera device 122 can be a rear/front-facing camera of the electronic device or a camera externally connected to the electronic device. The processor 160 can be implemented by the decoding module 130 and the processing module 150.

In some embodiments, the camera device 122 can adjust the parameters for barcode shooting by means of the user interface of the electronic device, such as adjusting exposure, focal length and light sensitivity, so that the camera device 122 can obtain a clearer barcode image. The camera device 122 transmits the captured preview image 20 to the processing module 150, the processing module 150 synthesizes the preview image 20 and the prompt mark 60 into the synthesized image 70, and the synthesized image is displayed through the displayer 140. At the moment, the user can see a shooting scene through the synthesized image 70, and then adjust the setting and angle of the camera device 122.

In some embodiments, the decoding module 130 in the processor 160 can be implemented by an application (APP) and interacts with the processing module 150, so as to save the space required by the device. The APP can be selected and started from a plurality of applications through the user interface. After the camera device 122 shoots the barcode, the preview image 20 will be transmitted to the processing module 150 for image processing, such as background noise removal, image brightness adjustment and contrast ratio adjustment, so that the barcode image can be better recognized. Then the processing module 150 converts the image into a digital signal, that is, the barcode image is binarized, black and white parts in the barcode image are converted into binary digits of 0 and 1. The decoding module 130 decodes the digital signal by the decoding algorithm to obtain the barcode information represented by the barcode. Different from the decoding module 130 in the barcode engine 110, in some embodiments, the decoding module 130 in the barcode engine 110 is provided with a special decoding chip and a scanner head, so that high decoding speed and high accuracy are achieved; and the decoding module 130 in the processor 160 may have the characteristics of being more convenient and free of purchasing or additionally installing elements.

In some embodiments, the processor 160 can further design the APP according to the requirements of the user, for example, the processor 160 is connected to a storage module, and the preview image 20 and/or the barcode information are/is recorded in a local access or online access mode. In some embodiments, menu, check box, label and other character fields can be established on the user interface to meet the requirements of the user.

In some embodiments, the barcodes may have the same or different barcode types at the same time, and specifically, the barcodes may be in the same coding mode (namely the same barcode type) or in different coding modes (namely different barcode types). In some embodiments, the barcodes can be, but are not limited to, any one-dimensional barcode (such as a Code 39 barcode, an interleaved 25 barcode, an EAN-13 barcode, an EAN-8 barcode or a Code 128 barcode) or any two-dimensional barcode (such as a QR Code barcode, a PDF 417 barcode, a combined barcode or a Data Matrix barcode). The one-dimensional barcode can represent barcode information of dozens of bits of characters, and the two-dimensional barcode can represent barcode information of thousands of characters. In some embodiments, the barcodes are usually used for commodity identification, stock control, logistics management and the like.

In some embodiments, the optical sensing module 120 can be implemented by a combination of a lens, an optical element and an image processor.

In some embodiments, the processor 160 can be implemented by one or more processors. Each processor can be but is not limited to a central processing unit, a system on chip (SOC), a microprocessor for general purpose or special purpose, a digital signal processor (DSP), a programmable logic controller (PLC), application specific integrated circuits (ASIC), a programmable logic device (PLD), other similar processing devices or a combination of the devices.

In some embodiments, the displayer 140 can be but is not limited to a touchscreen or a general display screen (namely, the displayer does not have a touch function). When the displayer 140 is the touchscreen, the user interface can be the displayer 140 or an input device such as an additionally arranged keyboard, one or more keys, a handwriting board or any combination thereof.

In conclusion, in some embodiments, the barcode image recognition method and the barcode image recognition device 100 can decode and output the barcode information of the expected barcode from the plurality of barcodes, and thus the barcode information of the expected barcode can be accurately and controllably obtained.

What is claimed is:

1. A barcode image recognition method, comprising:
   capturing at least one barcode to generate a preview image, the preview image having at least one barcode image of the at least one barcode;
   decoding the barcode image to obtain barcode information and a plurality of vertex coordinates of the barcode image;
   caching the barcode information of the barcode image;
   forming a plurality of image boundaries of the barcode image with the plurality of vertex coordinates of the barcode image;
   generating a detection beeline from a specified point to a side edge of the preview image;
   determining the number of intersections of the plurality of image boundaries of the barcode image and the detection beeline;
   identifying the barcode image with odd number of intersections from the at least one barcode image as a target image; and
   outputting the barcode information of the target image.

2. The barcode image recognition method according to claim 1, wherein the decoding step is executed through a barcode engine.

3. The barcode image recognition method according to claim 1, further comprising:
   synthesizing the preview image and a prompt mark corresponding to the specified point to form a synthesized image; and
   displaying the synthesized image.

4. The barcode image recognition method according to claim 3, wherein the prompt mark is a cross line taking the specified point as an intersection or a geometric figure taking the specified point as a center.

5. The barcode image recognition method according to claim 1, wherein the barcode information is a text or a website.

6. The barcode image recognition method according to claim 1, further comprising:

abandoning the barcode information of the barcode image with even number of intersections in the at least one barcode image.

7. The barcode image recognition method according to claim 1, wherein the outputting step comprises:
displaying the barcode information in a result field.

8. A barcode image recognition device, comprising:
an optical sensing module, configured to scan at least one barcode to generate a preview image, the preview image having at least one barcode image of the at least one barcode;
a decoding module, coupled to the optical sensing module and configured to decode the barcode image to obtain barcode information and a plurality of vertex coordinates of the barcode image;
a displayer; and
a processing module, coupled to the decoding module and the displayer and configured to determine a target image according to the number of intersection points of a detection beeline from a specified point to a side edge of the preview image and a plurality of image boundaries of the barcode image and display the barcode information of the target image on the displayer.

9. The barcode image recognition device according to claim 8, wherein the optical sensing module and the decoding module are a barcode engine.

10. The barcode image recognition device according to claim 8, wherein the optical sensing module is a camera device; and the decoding module and the processing module are a processor.

11. The barcode image recognition device according to claim 8, wherein the processing module is further configured to synthesize the preview image and a prompt mark corresponding to the specified point to form a synthesized image and display the synthesized image on the displayer.

* * * * *